United States Patent [19]

Tamaki

[11] Patent Number: 5,359,581
[45] Date of Patent: Oct. 25, 1994

[54] DETECTOR FOR MOVING VELOCITY OF LIGHT BEAM SPOT

[75] Inventor: Kenji Tamaki, Tokyo, Japan

[73] Assignee: Canon Kabushiki Kaisha, Tokyo, Japan

[21] Appl. No.: 183,260

[22] Filed: Jan. 19, 1994

Related U.S. Application Data

[63] Continuation of Ser. No. 893,890, Jun. 4, 1992, abandoned, which is a continuation of Ser. No. 547,225, Jul. 3, 1990, abandoned.

[30] Foreign Application Priority Data

Jul. 4, 1989 [JP] Japan .................. 1-171101
Jun. 27, 1990 [JP] Japan .................. 2-166855

[51] Int. Cl.$^5$ .............................. G11B 7/085
[52] U.S. Cl. ........................ 369/44.28; 369/32; 369/44.34
[58] Field of Search ............. 369/44.27, 44.28, 44.29, 369/44.34, 32, 33, 41, 44.35, 44.36; 360/78.04, 78.11, 77.03

[56] References Cited

U.S. PATENT DOCUMENTS

| | | | |
|---|---|---|---|
| 4,104,573 | 8/1978 | Goshima et al. | |
| 4,627,038 | 12/1986 | Abed et al. | |
| 4,659,972 | 4/1987 | Uchikoshi et al. | 369/32 |
| 4,740,939 | 4/1988 | Kimura et al. | |
| 4,748,607 | 5/1988 | Nakane | 369/44.28 |
| 4,839,876 | 6/1989 | Fennema | 369/44.28 |
| 4,907,109 | 3/1990 | Senio | 360/78.04 |
| 4,942,564 | 7/1990 | Hofer et al. | 369/44.11 |
| 4,955,011 | 9/1990 | Baba | 369/32 |
| 5,063,549 | 11/1991 | Yamamuro | 369/44.28 |
| 5,072,434 | 12/1991 | Uchikoshi et al. | 369/44.28 |
| 5,088,075 | 2/1992 | Yokota | 369/44.28 |
| 5,101,386 | 3/1992 | Kojima et al. | 369/44.28 |

FOREIGN PATENT DOCUMENTS 0301791 2/1989 European Pat. Off. .
63-173230 7/1988 Japan .

*Primary Examiner*—W. R. Young
*Assistant Examiner*—Nabil Hindi
*Attorney, Agent, or Firm*—Fitzpatrick, Cella, Harper & Scinto

[57] ABSTRACT

A light beam spot moving velocity detector which can accurately detect a velocity in a low velocity range in a seek operation of a light beam spot. The light beam spot moving velocity detector comprises a memory for producing a prestored operation value based on a normalized tracking error signal, a differentiator for differentiating the tracking error signal, and a multiplier for multiplying the output of the memory means with the output of the differentiator. The output of the multiplicate represents the moving velocity of the light beam spot.

6 Claims, 4 Drawing Sheets

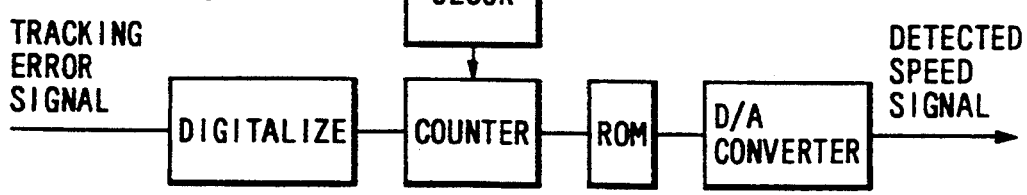
FIG. 1 PRIOR ART
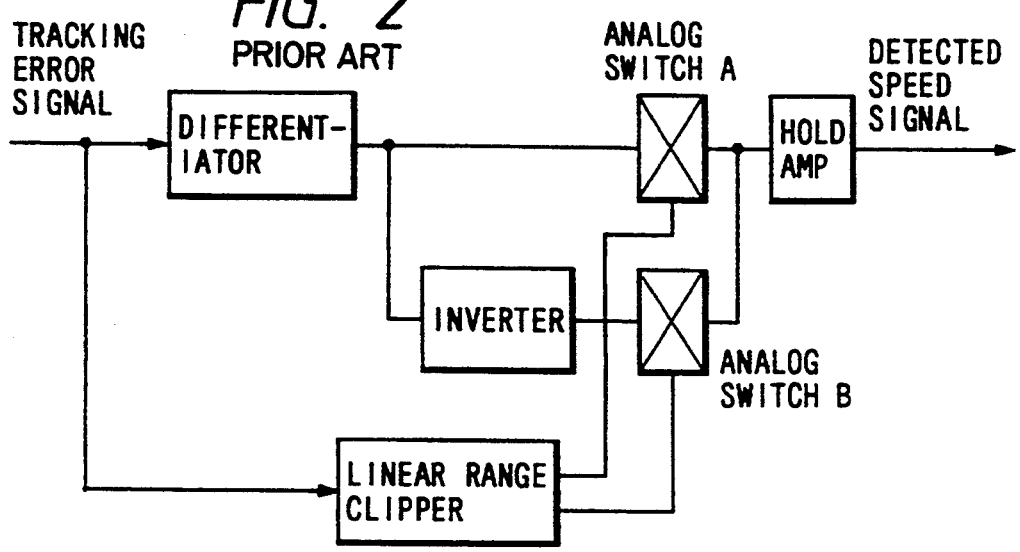
FIG. 2 PRIOR ART
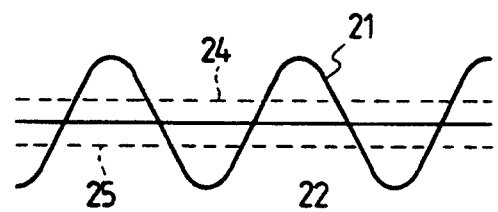
FIG. 3A PRIOR ART
FIG. 3B PRIOR ART
FIG. 3C PRIOR ART
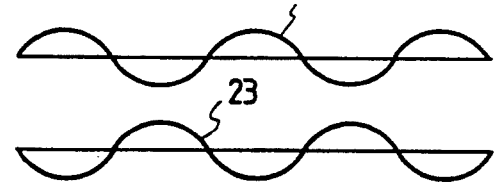
FIG. 3D PRIOR ART
FIG. 3E PRIOR ART
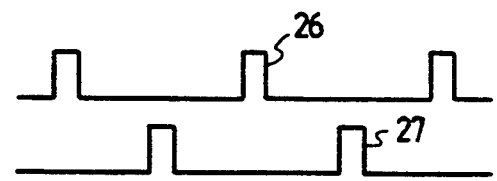
FIG. 3F PRIOR ART

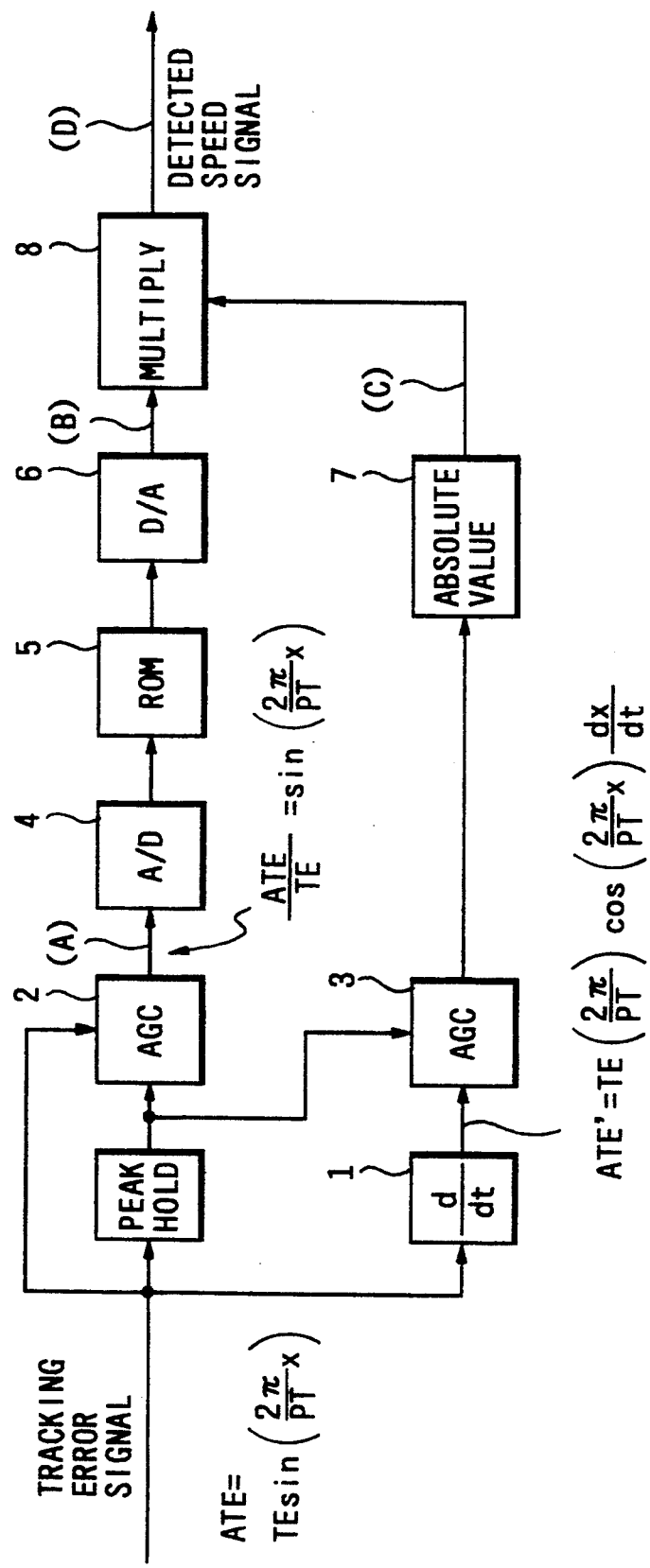

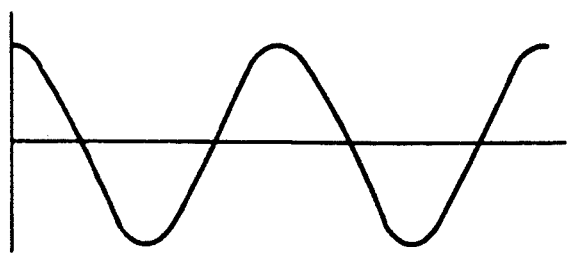
FIG. 5A
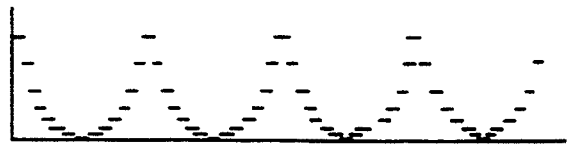
FIG. 5B
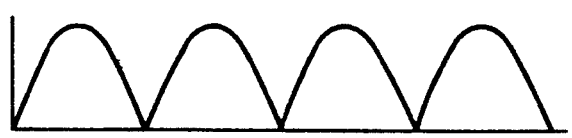
FIG. 5C
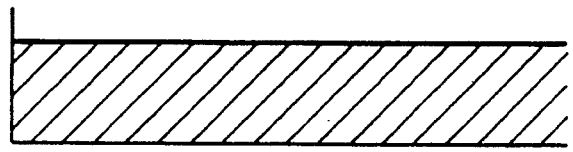
FIG. 5D
FIG. 6
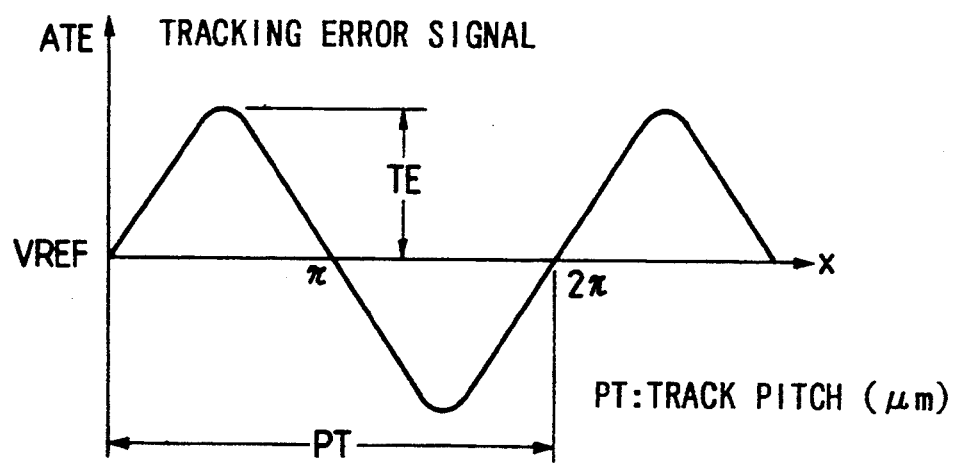

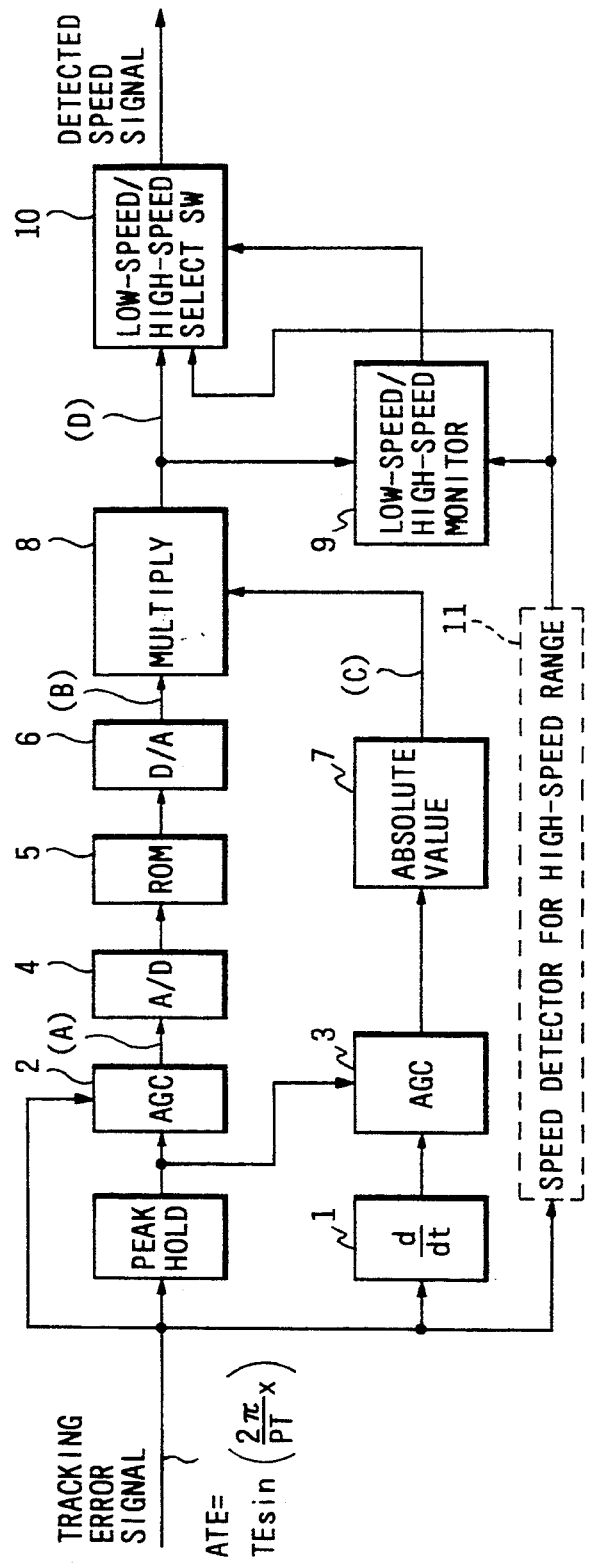
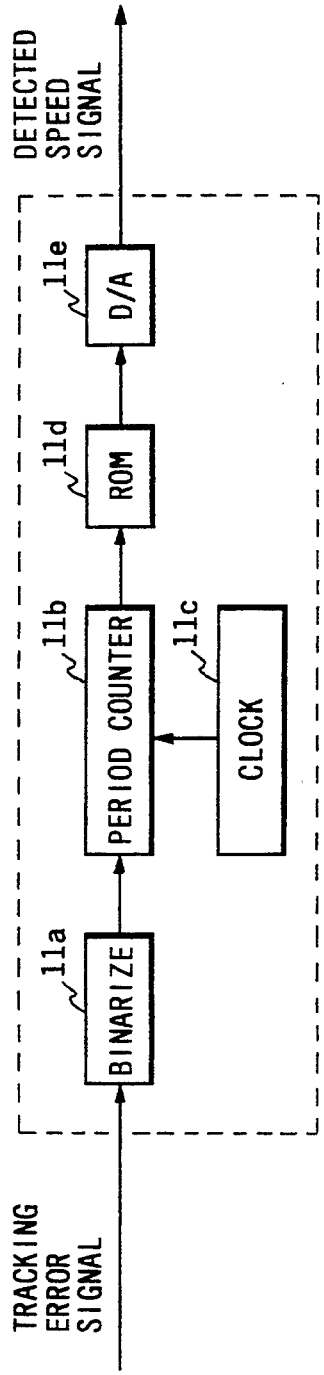

DETECTOR FOR MOVING VELOCITY OF LIGHT BEAM SPOT

This application is a continuation of application Ser. No. 07/893,890 filed Jun. 4, 1992, now abandoned, which is a continuation of application Ser. No. 07/547,225 filed Jul. 3, 1990, now abandoned.

BACKGROUND OF THE INVENTION

1. Field of the Invention

The present invention relates to an optical information recording/reproducing apparatus for recording and/or reproducing information on and/or from an optical disk having a plurality of tracks by using a light beam spot, and more particularly to a velocity detector in such an apparatus for detecting the moving velocity of the light beam spot during a seek operation to direct the light beam spot to a desired track on the optical disk.

2. Related Background Art

In recent advancement of laser technology, the development of a high capacity, high density random access optical disk has been attracting attention. In such an optical disk, a finely focused light beam spot is directed to a desired track on a recording medium (disk) and moved along the desired track to record and/or reproduce information.

Various accessing methods have been deviced. Among others, a cross-track method in which a target track is sought by counting the number of tracks which the light beam spot crosses when it accesses to the target track has been attracting attention because of its high seeking precision.

In such a cross-tracking system, the target track is sought by counting the number of tracks crossed and a signal which relates to the difference between a command velocity and the real velocity of the light beam spot on the disk is supplied to light beam spot moving means such as a linear motor based on the number of tracks crossed in order to control the velocity of the light beam spot.

The command velocity is generated in accordance with a velocity profile generated by a CPU in accordance with a seek distance prior to seeking, and the real velocity may be measured by one of various methods.

An example of real velocity measurement method is disclosed in Japanese Laid-Open Patent Application No. 63-173230. This method is described below.

In this method, a velocity detection method called a period measurement type is used when the moving velocity of the light beam spot is high, and a velocity detection method called a differentiation type is used for a low velocity.

The period measurement type velocity detection method is first explained. FIG. 1 shows a block diagram of the period measurement type velocity detector.

In FIG. 1, when the light beam spot moves across a track, a tracking error signal is in a form of a sine wave. The sine wave signal is digitized and one-period interval of the pulse signal is measured based on a reference clock. A reciprocal of the measured value is determined from a ROM table to produce a velocity signal.

The differentiation type velocity detection method is now explained. FIGS. 2 and 3 show a block diagram of the differentiation type velocity detector and signal waveforms at various points of the block diagram.

In FIGS. 2 and 3, a sine wave tracking error signal 21 generated when the light beam spot crosses the track is converted to differentiated waveforms 22 and 23 by a differentiator and an inverter. On the other hand, a linear range clipper produces timing signals 26 and 27 based on threshold levels 24 and 25 corresponding to a linear range of the tracking error signal and supplies them to switches A and B. The switches A and B close when the timing signal is of high level, and open when the timing signal is of low level. Thus, the switch A transmits only positive peak portions of the differentiated waveform 22 to a succeeding stage by the timing signal 26, and the switch B transmits only positive peak portions of the differentiated waveform 23 to the succeeding stage by the timing signal 27. As a result, a signal 28 which is close to a D.C. signal is produced at an output of a hold amplifier if the frequency of the tracking error signal is constant. Since the output 28 is produced by the differentiation, it is of a high level when the frequency of the tracking error signal is high, and of a low level when the frequency of the tracking error signal is low. That is, the output 28 represents the moving velocity of the light beam spot on the disk.

The reason for using different detection methods for the high moving velocity and the low moving velocity is explained below. The period measurement type velocity detection method generates a significant phase lag in low velocity detection and it is therefore, not suitable to the low velocity detection. However, because of its wide dynamic range, it is effective in other velocity ranges including the high speed range. The differentiation type velocity detection method generates a small phase lag but it is difficult to attain the velocity detection of a wide dynamic range.

By using both methods in a manner to complement the defects of respective methods, velocity detection over the entire velocity can be attained.

However, the above velocity detection methods involves the following problems.

In the velocity detection in the low velocity range, only positive peak areas of the differentiated signal and the inverted signal thereof which correspond to the linear range of the tracking error signal are sampled, and the sampled value is held during the sample-to-sample interval to produce a continuous velocity signal. However, if the velocity changes due to any external disturbance during the sample hold period, correct velocity detection for that velocity change cannot be attained. Further, in the vicinity of the target track, the velocity is low and the period of the differentiated waveform of the tracking error signal is long. As a result, if the target track is reached during the peak hold period or an external disturbance such as vibration is applied, the track pull-in may be done without detecting a correct velocity. This results in inaccurate velocity control of the light beam spot and impedes accurate access to the target track.

SUMMARY OF THE INVENTION

It is an object of the present invention to provide a light beam spot moving velocity detector which can accurately detect a velocity in a low velocity range in a seek operation of a light beam spot.

The above object is achieved by a light beam spot moving velocity detector comprising normalization means for normalizing a tracking error signal detected when a track is sought, memory means for producing a prestored operation value based on the output of the normalization means, differentiation means for differentiating the tracking error signal detected by the detection means, and multiplication means for multiplying the output of the memory means with the output of the differentiation means. The output of the multiplication means represents the moving velocity of the light beam spot.

BRIEF DESCRIPTION OF THE DRAWINGS

FIG. 1 shows a block diagram of a prior art light beam spot moving velocity detector for a high velocity range, FIG. 2 shows a block diagram of a prior art light beam spot moving velocity detector for a low velocity range, FIGS. 3A to 3F show signal waveforms at various points in the block diagram of FIG. 2, FIG. 4 shows a block diagram of a first embodiment of a velocity detector of the present invention, FIGS. 5A to 5D show signal waveforms at various points in the block diagram of FIG. 4, FIG. 6 shows a signal waveform of a tracking error signal, FIG. 7 shows a block diagram of a second embodiment of the present invention which uses the velocity detector of the present invention shown in FIG. 4 as a velocity detector in a low velocity range, and FIG. 8 shows a detailed block diagram of the velocity detector shown in FIG. 7 in a high velocity range.

DESCRIPTION OF THE PREFERRED EMBODIMENTS

The principle of the velocity detection method of the present invention is first explained.

A sine wave tracking error signal (ATE) which is generated when a light beam spot crosses a track in an access mode is represented by $$ATE = TE\sin\left(\frac{2\pi}{P_T} x\right) \quad (1)$$

where TE is an amplitude and $P_T$ is a track pitch (see FIG. 6).

In order to obtain velocity information based on the tracking error signal, the tracking error signal is first differentiated by time t, $$ATE' = TE\left(\frac{2\pi}{P_T}\right)\cos\left(\frac{2\pi}{P_T} x\right)\frac{dx}{dt} \quad (2)$$

The above formula is rewritten to $$\frac{dx}{dt} = ATE'\left(TE\left(\frac{2\pi}{P_T}\right)\cos\left(\frac{2\pi}{P_T} x\right)\right)^{-1} \quad (3)$$

The tracking error signal ATE is normalized to get $$\frac{ATE}{TE} = \sin\left(\frac{2\pi}{P_T} x\right) \quad (4)$$

Since $$\cos \omega t = \sqrt{1 - \sin^2 \omega t} \quad (5)$$

the formula (4) is rewritten to $$\cos\left(\frac{2\pi}{P_T} x\right) = \sqrt{1 - \left(\frac{ATE}{TE}\right)^2} \quad (6)$$

By placing the formula (6) in the formula (3), the velocity information dx/dt is expressed by $$\frac{dx}{dt} = ATE'\left(TE\left(\frac{2\pi}{P_T}\right)\sqrt{1 - \left(\frac{ATE}{TE}\right)^2}\right)^{-1} \quad (7)$$

In the formula (7), $$ROM\ data = \left(TE\left(\frac{2\pi}{P_T}\right)\sqrt{1 - \left(\frac{ATE}{TE}\right)^2}\right)^{-1} \quad (8)$$

which has previously calculated based on the normalized signal $$\frac{ATE}{TE}\left(= \sin\left(\frac{2\pi}{P_T}\right)\right)$$

of the tracking error signal is stored in a ROM which is a memory unit.

Thus, the ROM data is read in accordance with the normalized signal ATE/TE of the tracking error signal, and it is multiplied with the differentiated signal ATE' of the tracking error signal given by the formula (7) to produce the velocity information dx/dt.

FIG. 4 shows a circuit block diagram of one embodiment of the present invention which implements the above calculation method.

In FIG. 4, when the tracking error signal (formula (1)) detected by the detection means (not shown) is applied, it is normalized by an AGC amplifier 2 which produces a normalized signal (formula (4)). The normalized signal is digitized by an A/D converter 4 and a prestored operation value is read from a ROM 5 as the ROM data (formula (8)). It is further converted to an analog signal by a D/A converter and it is supplied to a multiplier 8.

On the other hand, the tracking error signal (formula (1)) is differentiated by a differentiator 1 to produce the differentiated signal (formula (2)). It is further normalized by an AGC amplifier 3 so that it is not affected by an amplitude variation when the light beam crosses the track at a high velocity. The absolute value of this signal is then determined by an absolute value circuit 7 and it is multiplied with the analog signal of the ROM data (formula (8)) by the multiplier 8, which produces the velocity information (formula (7)).

FIGS. 5A–5D show waveforms at various points in FIG. 4. FIG. 5A shows the normalized signal of the tracking error signal and it is the output waveform of the AGC amplifier 2 of FIG. 4. FIG. 5B shows the output waveform of the D/A converter 6 and FIG. 5C shows the output waveform of the absolute value circuit 7. The signals of FIGS. 5B and 5C are multiplied to produce the velocity information shown in FIG. 5D at the output of the multiplier 8.

A second embodiment of the present invention is now explained with reference to FIG. 7. In the present embodiment, period measurement type velocity detection means is combined with the configuration of the first embodiment. The velocity detection method of the present invention shown in the first embodiment is used in the low velocity range, and the prior art period measurement type velocity detection method is used for the high velocity range so that excellent velocity detection is performed over the entire velocity range.

In FIG. 7, the like numerals to those of the previous drawings denote like elements.

In the second embodiment, there are two loops for detecting the velocities in the low velocity range and the high velocity range. These are switched by a switch 10 at a switching timing determined by a low velocity/high velocity monitor 9.

For example, in the switching from the low velocity system to the high velocity system, the output of the multiplier 8 is detected by the low velocity/high velocity monitor 9, and when it reaches a predetermined level (a limit of a band of the low velocity circuit), the low velocity/high velocity monitor 9 sends a switching timing pulse to the low velocity/high velocity switch 10. Conversely, in the switching from the high velocity system to the low velocity system, an output of a high velocity range velocity detector 11 is detected by the low velocity/high velocity monitor 9 and when it reaches the predetermined level, the low velocity/high velocity monitor 9 sends the switching timing pulse to the low velocity/high velocity switch 10. In this manner, excellent velocity detection is achieved over the entire velocity range from the beginning of movement to the maximum velocity when the track is sought at a maximum radial acceleration of the disk.

FIG. 8 shows the high velocity range velocity detector 11 of FIG. 7. The tracking error signal is binarized by a binarizing circuit 11a and a half-period interval of the binary signal is counted by a period counter 11b. A reciprocal of the count is read from a ROM 11d so that data which is proportional to the frequency or velocity is produced. The data is then converted to an analog signal by a D/A converter 11e to produce the velocity signal for the high velocity range.

What is claimed is:

1. A detector for detecting a moving velocity of a light beam spot in moving the light beam spot from a current track to seek a target track, comprising:

differentiation means for differentiating an analog tracking error signal indicating a relative position between a track and the light beam spot, detected during the seeking of the target track;

memory means for storing digital data representing a constant value according to the relative position between a track and the light beam spot;

a digital-to-analog converter for converting the digital data to an analog signal representing the constant value outputted from said memory means; and operation means for producing and outputting a signal corresponding to a value $$ATE' \left\{ TE\left(\frac{2\pi}{Pt}\right) \sqrt{1 - \left(\frac{ATE}{TE}\right)^2} \right\}^{-1}$$

comprising the value of the analog signal multiplied by a value of a signal corresponding to an output from said differentiation means by using the analog signal and the signal corresponding to the output from said differentiation means, wherein ATE is a tracking error signal, ATE' is a differential signal of ATE, TE is an amplitude of ATE, and Pt is a track pitch, wherein the value of the analog signal multiplied by the value of the signal corresponding to an output of said differentiation means indicates the moving velocity of the light beam spot relative to the track.

2. A detector according to claim 1, wherein said memory means outputs data representing a constant value according to a position of the light beam spot on the basis of a signal obtained by normalizing an amplitude of the tracking error signal.

3. A method for detecting a moving velocity of a light beam spot in moving the light beam spot from a current track to seek a target track, comprising the steps of:

differentiating an analog tracking error signal indicating a relative position between a track and the light beam spot, detected during the seeking of the target track so as to produce a differential signal;

storing digital data representing a constant value according to the relative position between a track and the light beam spot;

converting the digital data to an analog signal representing the constant value outputted in said storing step; and performing an operation of producing and outputting a signal corresponding to a value $$ATE' \left\{ TE\left(\frac{2\pi}{Pt}\right) \sqrt{1 - \left(\frac{ATE}{TE}\right)^2} \right\}^{-1}$$

comprising the value of the analog signal multiplied by the value of a signal corresponding to an output of said differentiation step by using the analog signal and the signal corresponding to the output of said differentiation step, wherein ATE is a tracking error signal, ATE' is a differential signal of ATE, TE is an amplitude of ATE, and Pt is a track pitch, wherein the value of the analog signal multiplied by the value of the signal corresponding to the output of said differentiation step indicates the moving velocity of the light beam spot relative to the track.

4. A detector according to claim 1, wherein the constant is represented by $$\left\{ TE\left(\frac{2\pi}{Pt}\right) \sqrt{1 - \left(\frac{ATE}{TE}\right)^2} \right\}^{-1}$$

wherein ATE is a tracking error signal, TE is an amplitude of ATE, and Pt is a track pitch.

5. A detector for detecting the moving velocity of a light beam spot relative to a track in moving the light beam spot from a current track on a recording medium having plural tracks to seek a target track during a seeking operation, comprising:

differentiation means for differentiating a tracking error signal having a sinusoidal waveform indicating the relative position of the light beam spot with respect to a track, detected during the seeking operation;

memory means for storing data representing a constant value according to the relative position of the light beam spot to a track; and operation means for deriving the constant value stored in said memory means, wherein the constant value varies, depending on the relative position of the light beam spot to the track in accordance with the tracking error signal, wherein said operation means also produces and outputs a signal corresponding to the constant value multiplied by the value of a signal corresponding to an output from said differentiation means by using the constant value and the output from said differentiation means, wherein the value of the signal corresponding to the constant value multiplied by the value of the signal corresponding to the output from said differentiation means indicates the moving velocity of the light beam spot relative to the track.

6. A method for detecting the moving velocity of a light beam spot relative to a track in moving the light beam spot from a current track on a recording medium having plural tracks to seek a target track during a seeking operation, comprising the steps of:

generating a differentiation signal by differentiating a tracking error signal having a sinusoidal waveform indicating the relative position of the light beam spot with respect to a track, detected during the seeking operation;

storing data representing a constant value according to the relative position of the light beam spot with respect to a track; and performing an operation for deriving the stored constant value, wherein the constant value varies, depending on the relative position of the light beam spot to the track in accordance with the tracking error signal, wherein said performing step further comprises the steps of producing and outputting a signal corresponding to the constant value multiplied by the value of a signal corresponding to an output of said generating step by using the constant value and the output of said generating step, wherein the value of the signal corresponding to the constant value multiplied by the value of the signal corresponding to the output of said generating step indicates the moving velocity of the light beam Spot relative to the track.

* * * * *

UNITED STATES PATENT AND TRADEMARK OFFICE
CERTIFICATE OF CORRECTION

PATENT NO. : 5,359,581
DATED : October 25, 1994
INVENTOR(S) : Tamaki

It is certified that error appears in the above-indentified patent and that said Letters Patent is hereby corrected as shown below:

Column 1

Line 28, "deviced." should read --devised.--

Column 2

Line 31, "the" should be deleted;
Line 37, "volves" should read --volve--;
Line 38, "the velocity" should read --velocity--.

Column 8

Line 25, "Spot" should read --spot--.

Signed and Sealed this

Eighteenth Day of April, 1995

Attest:

BRUCE LEHMAN

Attesting Officer

Commissioner of Patents and Trademarks